United States Patent [19]
Roesch

[11] 3,936,195
[45] Feb. 3, 1976

[54] DEVICE FOR DETERMINING THE POSITION OF A STRUCTURAL ELEMENT

[75] Inventor: Eduard Roesch, La Chaux-de-Fonds, Switzerland

[73] Assignee: Dixi S.A., Le Locle, Switzerland

[22] Filed: July 31, 1974

[21] Appl. No.: 493,601

[30] Foreign Application Priority Data
Aug. 15, 1973  Switzerland.................... 11732/73

[52] U.S. Cl................... 356/170; 250/209; 356/171
[51] Int. Cl.²........................................... G01B 11/00
[58] Field of Search ........... 356/156, 167, 169, 170, 356/171; 250/209, 578

[56] References Cited
UNITED STATES PATENTS
3,748,043    7/1973    Zipin.................................. 356/170

Primary Examiner—Alfred E. Smith
Assistant Examiner—Richard A. Rosenberger
Attorney, Agent, or Firm—Imirie, Smiley & Linn

[57] ABSTRACT

The invention is related to a device for determining the position of a structural element to which is affixed a scale composed of regularly spaced markings which are optically cast onto a line scanner containing regularly spaced photosensitive elements, the spacing between photosensitive elements being a subdivision of the distance between two adjacent markings of the scale. The output of the line scanner is coupled to a processing network which detects shifts in the shadows of the cast markings to evaluate the position of the element with precision. A pulse generator in the processing network provides pulses at a frequency which is a multiple of the rate of scanning of the photosensitive elements for measurement of a subdivision of the distance separating two photosensitive elements of the line scanner to obtain greater precision.

3 Claims, 5 Drawing Figures

DEVICE FOR DETERMINING THE POSITION OF A STRUCTURAL ELEMENT

BACKGROUND OF THE INVENTION

The present invention is related to a device for determining the position of a structural element having at least a scale composed of regularly spaced markings.

The exact determination of the position of any structural element compared with another fixed element plays a leading part in precision mechanics. This is especially true for machinetools having to perform any kind of work where desired accuracy cannot be obtained manually, but requires the help of automatic handling apparatus.

SUMMARY OF THE INVENTION

It is a main object of the present invention to solve this problem by means of a device where the structural element, whose exact position is to be determined, is provided with markings optically cast onto a line scanner containing a row of regularly spaced photosensitive elements, the spacing between photosensitive elements being a subdivision of the distance between two cast markings; an electronic circuit analyzes and extracts the result of measurement.

Additional objects and advantages of the present invention will become apparent upon consideration of the following description, when taken in conjunction with the accompanying drawings.

DESCRIPTION OF THE PREFERRED EMBODIMENT

Figure 1:
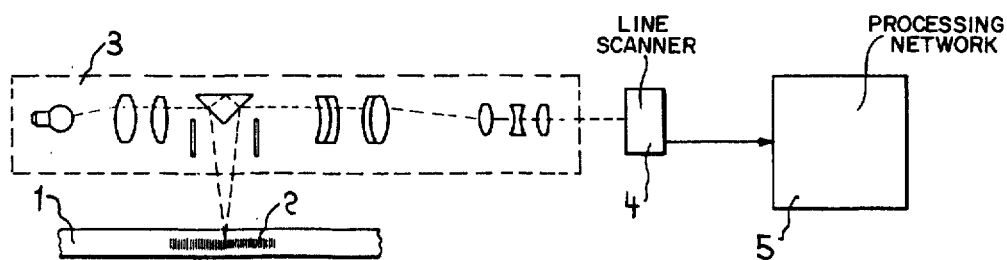
FIG. 1 is a diagrammatic view of an optical arrangement for casting shadow markings onto the line scanner according to the present invention.

As shown in FIG. 1, a structural element 1 is provided with a scale composed of markings 2. Some of the markings are illuminated by an optical system 3, not described in detail, which causes an enlarged shadow picture of two of the markings 2 to be cast onto a line scanner 4. Processing network 5 is connected to the output of scanner 4 for reading the measurement as will be described below.

Figure 2:
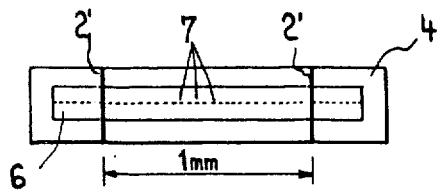
FIG. 2 is an elevational view showing the markings cast onto the line scanner.

In FIG. 2, a front elevational view of the line scanner 4 shows that it includes a window, inside of which a plurality of photosensitive elements 7 (photodiodes, phototransistors etc.) are set in a row. The two markings 2 are cast onto the front of the line scanner as shadow markings 2' which mask and darken a part of the photosensitive elements 7. Between these two shadow markings 2', there is a preselected number of elements 7, depending upon the enlargement obtained with the optical system 3. Assume that the optical enlargement is such that one hundred elements 7 lie between the two markings 2' cast onto the line scanner 4.

If the distance between the two markings 2, on the element 1, is one millimeter, the distance between two adjacent elements 7, on the device 4, will correspond to a hundredth part of a millimeter.

Figure 3:
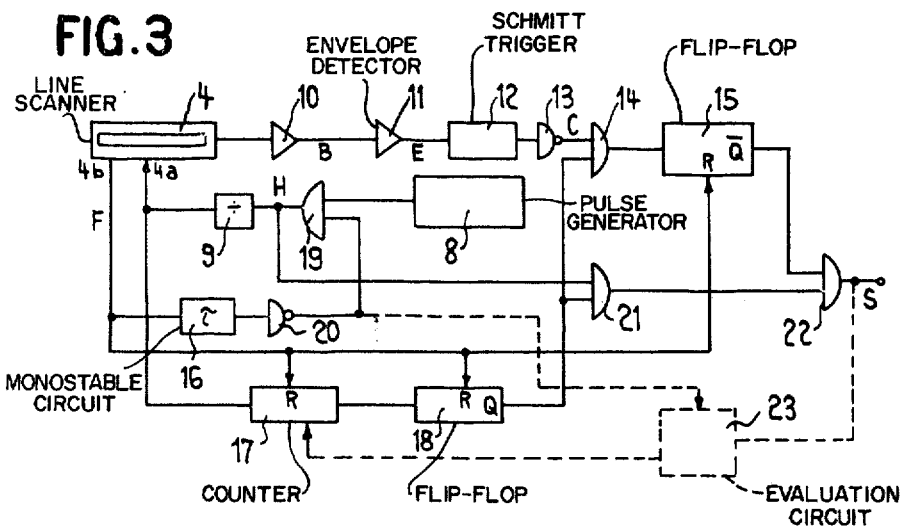
FIG. 3 is a schematic diagram of the circuit of FIG. 1 which analyzes and extracts the result of measurement.

The diagram of FIG. 3 shows a preferred embodiment of a circuit according to the present invention for determining the position of a shadow marking 2' on the device 4, i.e. the exact position of the structural element 1.

A pulse generator 8 supplies pulses with a frequency of $10^5$ Hz, for instance, directed to an AND gate 19. The output of the gate 19 is connected to a divider 9, dividing the frequency by ten in order to get the device 4, through its input 4a, to perform the scanning of the photosensitive elements 7. The frequency of scanning of elements 7 is then ten times lower than the frequency of pulses at the output of the generator 8. The output of the gate 19 also feeds one of the inputs of another gate 21, whereas the output of the divider 9 also feeds a programmable counter 17 so as to enable it to provide a flip-flop circuit 18 with two kinds of pulses according to its previously determined state: either one pulse at the beginning of a scanning cycle and another at two thirds of the cycle later, or one pulse one third through a scanning cycle and another just before the end of it. The output of the device 4, i.e. the result of scanning is directed to the amplifier 10, whose output is connected to an envelope detector circuit 11. This envelope passes then to a Schmitt trigger 12, whose output is connected, through an inverter 13, to one of the inputs of an AND gate 14. The output of the gate 14 feeds a flip-flop circuit 15, whose output $\overline{Q}$ is directed to one of an AND inputs of the gate 22. On the other hand, the output 4b of the scanning device produces an impulse F at the end of each scanning cycle. This pulse F will set the counter 17 on zero as well as the flip-flop 18 and flip-flop 15, through their respective reset inputs R. This pulse F will also change the state of a monostable circuit 16, whose output controls the second input of the gate 19 through an inverter 20. The output Q of the flip-flop 18 controls the second input of gate 14 and gate 21, and the output of the latter is connected to the second input of the gate 22.

Figure 4:
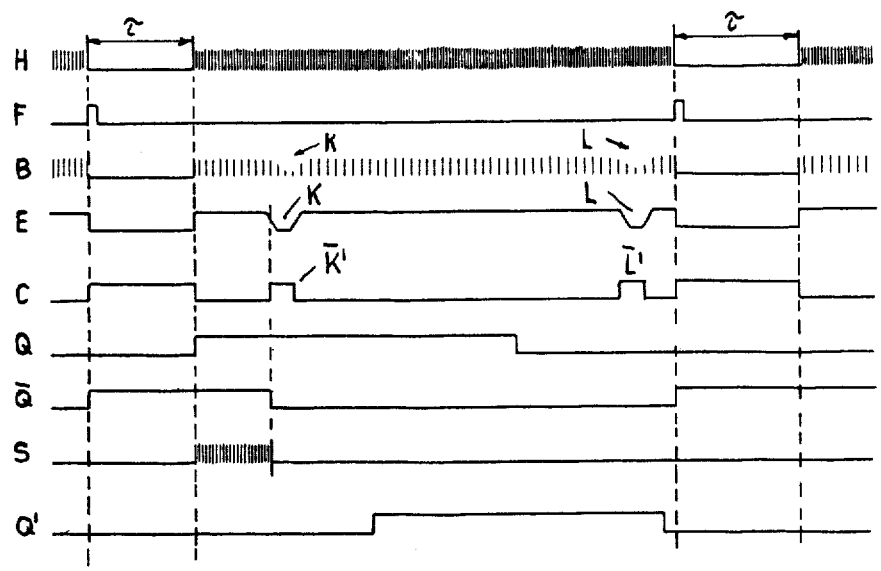
FIG. 4 is a diagrammatic view of various curves which are generated at different points of the circuit shown in FIG. 3.

The following explains the operation of the circuit of FIG. 3 by means of the diagrams of FIG. 4.

The pulses H at the output of the gate 19 are interrupted during a certain time τ determined by the monostable circuit 16 which, in turn, is triggered by the impulse F at the end of each scanning cycle.

At the output of the amplifier 10, the heights of pulse B will each correspond to the state of an element 7; if the latter is situated in a light zone, it will give an impulse of normal height; if it is in a darkened zone by a shadow marking 2', it will give an impulse whose height will be function of the rate of darkness (zone K). The detector 11 produces the envelope E from the pulses B, which exactly illustrates the illumination degree of the device 4. The Schmitt trigger 12 is responsive to the impulse K, giving the location of the marking 2' along the line scanner 4, produces a steep edge pulse K', which, inverted through the gate 13, provides the curve C and the pulse $\overline{K'}$. If the counter 17 is programmed to provide a pulse at the beginning and at the two thirds point of the cycle, it will change the state of the output Q of the flip-flop 18 twice. The output Q will then select, through gates 14 and 21, the first phase of scanning (curve Q). Pulses H will pass through the gate 21 only during this first phase. On the other hand, the output $\overline{Q}$, that has been set on 1 at the end of the cycle by the impulse F on reset input of the flip-flop 15, will return to 0 at the arrival of the pulse $\overline{K'}$. Then, at the output S of the gate 22, there will only be pulses H comprised between the beginning of the scanning cycle and the first shadow marking 2' cast onto the line scanner 4. This result can then be evaluated, as desired.

We have already seen that the distance between two elements 7, although not necessarily one hundredth of a millimeter, corresponds however to one hundredth of the distance between lines 2 in view of the fact that it divides-in hundred parts an "enlarged" shadow cast onto the line scanner 4. However, the pulses H will be an image in time one thousandth parts of such line spacing, because their frequency is ten times higher than that of the scanning impulses on input 4a. In other words, geometrical length is transformed into length of time, which can then be freely subdivided, due to precise relationships of frequencies. If pulses H at the output S of the gate 22 are then counted or otherwise evaluated, a certain number of thousandth parts of a millimeter (or other line spacing) will be obtained. If the element 1 is shifted a little and a new evaluation of impulses H made, the difference between the two results will give, with a precision of one micron, the measurement of the shifting of the structural element 1. The first measurement, or the first evaluation of pulses H fixes, in a way, the point zero or reference point, from which the shifting of the structural element 1 will be very exactly measured.

It will be noticed on FIG. 2 that the window 6 is wider than the "enlarged" cast millimeter. It is needed, in fact, to have at least one marking 2' on the scanner 4. If the window 6 were smaller than the cast millimeter, there would be a risk of having it simply framed by two markings 2'. On the other hand only one marking 2' can be used as a measure; for this purpose, the programmable counter 17 (FIG. 3) defines, by means of the flip-flop 18, two fields of the scanning cycle, one from the beginning to the two thirds of the cycle (impulse Q, FIG. 4), the other starting from the one third of the cycle, to stop a little before its end (impulse Q', FIG. 4). But each of these fields will have a smaller extension than the cast millimeter, so as to be able to contain only one marking 2' at once. In this way only one marking 2' will be used for a measurement. The FIG. 4 shows, on diagrams B, E and C, the location L, respectively the pulse $\overline{L'}$ at the output of the inverter 13, which has however no influence on the flip-flop 15, in view of the fact that the output Q of the flip-flop 18 has already closed the gate 14.

The device according to the invention permits to determine the position of the element only for distances shorter than that separating two markings 2: in the chosen example, only thousandth, hundredth and tenth parts of a millimeter can be determined. The number of centimeters and millimeters, for instance, should be first determined by another device, before the device on FIG. 4 is used.

The choice of the field of measurement can be done by an evaluation circuit 23 indicated by dots in FIG. 4, which, according to the result of the output S and the signal at the output of the gate 20 indicating the beginning and the end of the cycle, will choose, by a control input of the counter 17, the suitable field Q or Q'. In this case the measurement can be done in two times: first an evaluation cycle permitting to choose the field, then the measurement cycle.

By an outside device, not presented here, the counter 17 may also be provided with indications on the approximative position (with a precision of a half of a millimeter for instance) of the marking 2' on which the measurement is to be done.

Figure 5:
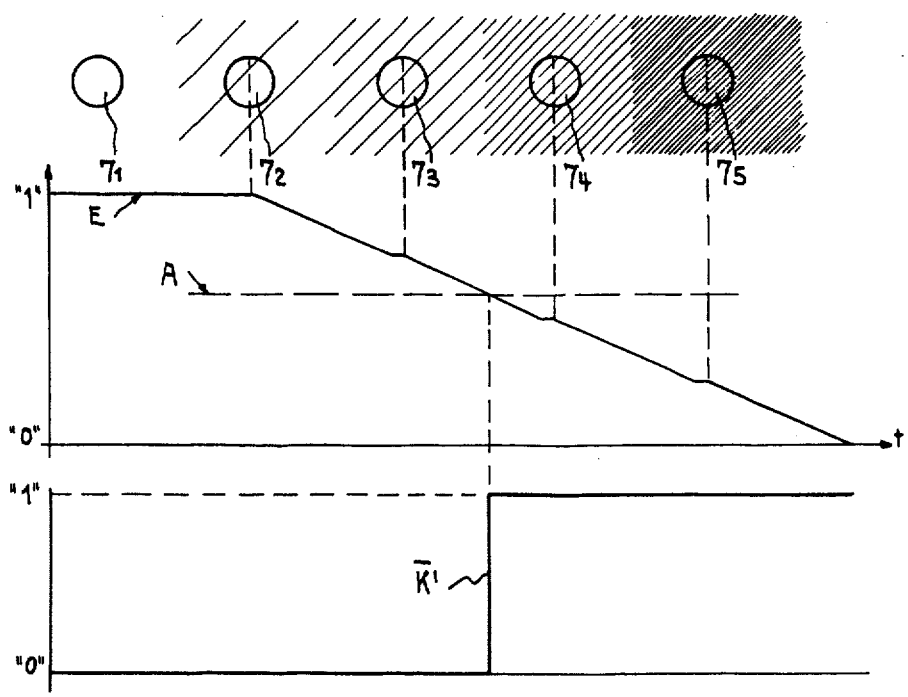
FIG. 5 is an enlarged diagrammatic view of the line scanner together with some of the curves of FIG. 4 illustrating operation of the invention.

FIG. 5 is intended to explain how to attain precision up to a micron, although in fact there is only a theoretical material precision equal to one hundredth part (i.e. the photosensitive elements 7 spaced by one hundredth part of millimeter "enlarged"). This figure shows, in a very large scale, the left side of a marking cast on the elements 7: $7_1$, $7_2$, $7_3$, $7_4$ and $7_5$. The element $7_1$ is still in full light and, as the passage from light to darkness is made through several elements, there will be generated an envelope E at place $\overline{K}$, as represented by the descending curve in FIG. 5. The dotted line A indicates at which level the Schmitt trigger 12 will change state and supply the impulse K'. It is noted that the Schmitt trigger defines exactly the location of the "side" of the marking 2', although optically this side is defined only up to some hundredths parts of a millimeter.

It is clear that the number of elements 7 between two markings 2' may be different than hundred, and the divider 9 can also have another factor of division. This will permit different degrees of precision to be obtained.

The markings 2 can be situated on an element 1 which might be cylindrical, straight or having a form appropriate to the measurement to be done: the measurement may in fact be that of length or of angles.

It will be understood that the above description of the present invention is susceptible to various modifications, changes and adaptations, and the same are intended to be comprehended within the meaning and range of equivalents of the appended claims.

What is claimed is:

1. A device for determining the position of a structural element having at least a part provided with regularly spaced markings, said device comprising a plurality of photosensors in a linear array, said photosensors being regularly spaced from each other, means optically projecting at least two of said markings onto said photosensor array, the distance between adjacent photosensors being a subdivision of the distance between said two projected markings, means coupled to said array for scanning the photosensors, an envelope detector circuit coupled to receive output signals emitted by the photosensors, and output means responsive to said envelope detector for providing a pulse train having a length representative of the position of the structural element.

2. A device in accordance with claim 1, wherein said scanning means comprises a pulse generator and divider means coupling the output of said generator to said array to establish the scanning frequency of the photosensors, the output of said pulse generator being further connected to said output means to provide said pulse train; and further including a Schmitt trigger connected to the output of said envelope detector, a first flip-flop circuit coupled to said Schmitt trigger for actuation thereby and a first AND gate controlled by said first flip-flop and connecting the output of said pulse generator to said output means.

3. A device in accordance with claim 2, further including a programmable counter responsive to said scanning means for actuating a second flip-flop circuit, and a second AND gate controlled by said flip-flop and through which the output pulses of said pulse generator pass, said programmable counter controlling said flip-flop to cause said AND gate to pass said pulse generator output during either of two time measurement intervals.

* * * * *